Feb. 6, 1968  E. JONSSON  3,367,312
ENGINE BRAKING SYSTEM
Filed Jan. 28, 1966  3 Sheets-Sheet 1

INVENTOR:
EINAR JONSSON

By Smyth, Roston & Pavitt
ATTORNEYS

Feb. 6, 1968  E. JONSSON  3,367,312
ENGINE BRAKING SYSTEM
Filed Jan. 28, 1966  3 Sheets-Sheet 3

INVENTOR:
EINAR JONSSON
ATTORNEYS

United States Patent Office 3,367,312
Patented Feb. 6, 1968

3,367,312
ENGINE BRAKING SYSTEM
Einar Jonsson, Palos Verdes, Calif., assignor to White Motor Corporation, Cleveland, Ohio, a corporation of Ohio
Filed Jan. 28, 1966, Ser. No. 523,742
10 Claims. (Cl. 123—97)

This invention relates to a control system for converting an internal combustion engine, whenever desired, from normal power operation to braking operation. In a four-cycle engine, for example, the braking operation is accomplished by, in effect, converting the engine temporarily into a two-cycle compressor. As well known in the art, the conversion may be carried out by cutting off the fuel and advancing the operation of the exhaust valves of the engine 180° of the rotation of the crankshaft to cause the exhaust valves to open at or near the ends of the compression strokes of the pistons.

Various control systems for this purpose have been suggested heretofore. Some of the suggested systems involve axial or rotary shift of the cam shaft, other prior art arrangements require complicated linkages or special mechanisms to operate the exhaust valves independently of the cam shaft. Still other arrangements utilize special bypass ports. In general these prior art developments have been found to be either mechanically impractical or too expensive for widespread acceptance.

The present invention avoids the usual difficulties by requiring only minimum modification of the conventional valve-operating mechanism of an engine, and by requiring only minimum additional moving parts. In the preferred practice of the invention, structural complications are further avoided by a hydraulic remote control system, the power of which may be derived either from the fuel pump or, preferably, from the lubricant pump of the engine.

While the underlying principles of the invention are applicable to various types of vehicles powered by various types of internal combustion engines, the invention has special utility for diesel trucks. Accordingly the present disclosure is directed specifically to an engine braking system for a diesel truck, such a disclosure providing adequate guidance for those skilled in the art who may have in mind other specific applications of the invention.

An important feature of the invention is the concept of employing a single cam on the usual cam shaft to control the corresponding exhaust valve for both normal operation of the engine and braking operation of the engine, each cam being, in effect, a dual-function cam. For this purpose each cam is shaped with an outer radial zone having a first shoulder to cooperate with an associated follower for one of the two modes of operation of the engine and an inner radial zone with a second shoulder spaced circumferentially from the first shoulder to cooperate with the cam follower for the other of the two modes of operation. Broadly described, the control system is completed by the provision of remotely controlled means to shift the responsiveness of the exhaust valves between the two radial zones of the cam selectively.

In one practice of the invention where the exhaust valves are opened by rocker arms actuated by cams in the usual manner, the axis of oscillation of all of the rocker arms is shifted in unison to substantially eliminate lost motion between the cams and the exhaust valves and thereby shift the responsiveness of the exhaust valves from one radial zone of the cams to the other radial zone. For this purpose the rocker arms are journalled on eccentric portions of a common control shaft and all of the rocker arms are shifted simultaneously by slight rotation of the control shaft.

In a second practice of the invention, the shift of the responsiveness of the exhaust valves from one cam zone to the other is accomplished by incorporating the lost motion in the construction of the rocker arms themselves and removing the lost motion hydraulically by remote control to shift the responsiveness of the exhaust valve from one cam zone to the other. As will be explained, a feature of the second practice of the invention in this regard is the use of torque tubes to supply hydraulic fluid to the various oscillating rocker arms without the necessity of employing dynamic seals.

The various features and advantages of the invention may be understood from the following detailed description and the accompanying drawings.

In the drawings, which are to be regarded as merely illustrative:

Figure 6:
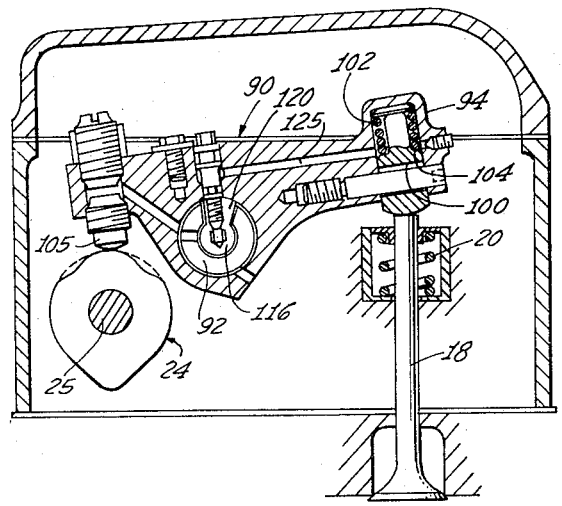
Figure 7:
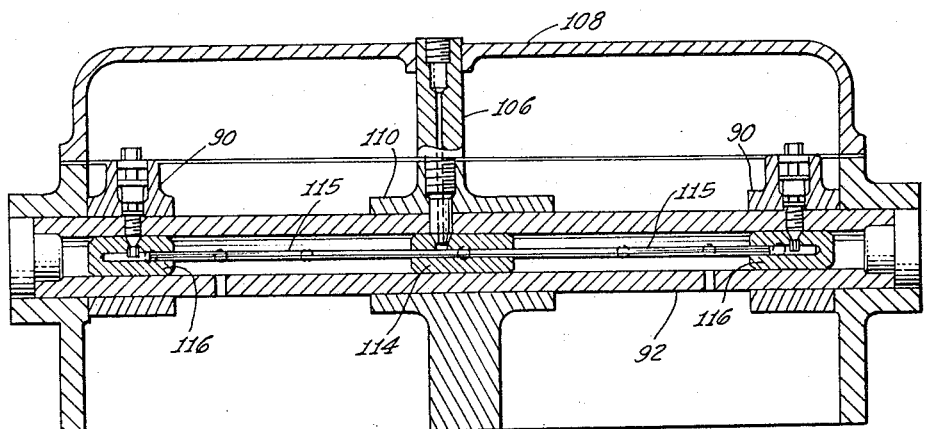

FIG. 6 is a sectional view of a rocker arm employed in the second practice of the invention showing hydraulic means carried by the rocker arm for removal of the lost motion to carry out the braking operation of the engine; and FIG. 7 is a sectional view along the line 7—7 of FIG. 6 showing how hydraulic actuating fluid is supplied to a pair of the rocker arms by a pair of torque tubes without the necessity of employing dynamic seals.

Figure 1:
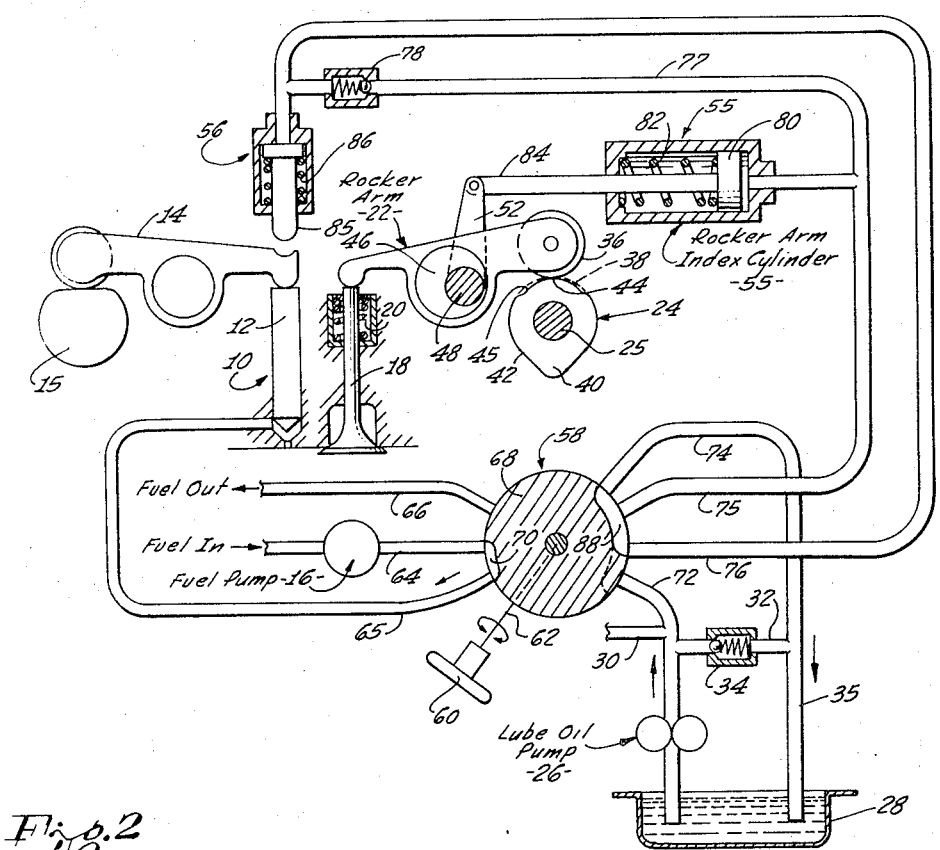
FIG. 1 is a diagrammatic representation of a selected embodiment of the invention with the parts of the control system positioned for normal power operation of the engine.

FIG. 1 is a diagram relating to a diesel truck, various parts of a conventional diesel engine being indicated in the diagram. A mechanically actuated fuel injector 10 which is representative of all of the fuel injectors of the engine, has a spring biased plunger 12 which is actuated by a rocker arm 14 under the control of a corresponding cam 15. The usual fuel pump 16 supplies fuel to the injector. An exhaust valve 18 which is representative of all of the exhaust valves of the engine is biased to closed position by an associated spring 20 and is opened by a corresponding rocker arm 22. In the usual manner, the rocker arm is actuated by a corresponding cam 24 on a cam shaft 25 and the rocker arm is spring biased towards the cam.

FIG. 1 further shows diagrammatically the usual lubrication pump 26 which draws lubricant from the crankcase 28 of the engine and delivers the lubricant to passage 30 for distribution among the various working parts. The usual bypass 32 equipped with a relief valve 34 connects the discharge side of the lubrication pump 26 with a return line 35.

The cam 24 for operating each exhaust valve 18 cooperates with a follower in the form of a roller 36 on the corresponding rocker arm 22 and in accord with the teaching of the invention, the cam is shaped to provide an inner radial operating zone and an outer radial operating zone to be used selectively for the two modes of operation of the engine. The boundary between the two radial zones is a circle on a radius R, a part of the circle being indicated by the dotted arc 38. Either radial zone of the cam may be used for either mode of operation, but in this instance the inner zone is used for braking operation of the engine and the outer zone is used for normal power operation. In the outer radial zone that lies outside the circle 38, the cam 24 is formed with a lobe 40 which opens the relief valve 18 in the usual manner in the normal operation of the engine for driving the truck. Thus, assuming the cam 24 rotates clockwise as viewed in FIG. 1, a shoulder or rise 42 on one side of the lobe 40 normally opens the exhaust valve 18. In the inner radial zone of the cam which lies inside the circle 38, the cam is formed with an inner dwell 44 that leads to an inner rise or shoulder 45 that cooperates with the follower 36 to open the corresponding exhaust valve 18 when the engine is functioning as a brake. Since the braking operation requires that the opening of the exhaust valve be advanced by an amount equivalent to 180° of rotation of the crankshaft and since the cam shaft 25 rotates at half of the velocity of the crankshaft, the two shoulders 42 and 45 are approximately 90° apart.

During normal power operation of the engine, the inner rise 45 lifts the follower 36 to a degree that merely takes up lost motion between the cam and the exhaust valve, the exhaust valve being subsequently opened by the rise 42 in the outer radial zone of the cam. To make the exhaust valve respond temporarily to the inner rise 45, it is merely necessary to eliminate temporarily the lost motion between the cam and the exhaust valve. In this first embodiment of the invention the lost motion is eliminated by simply shifting the rocker arm bodily towards the cam.

To change over from normal power operation of the engine to braking operation, any suitable control system may be provided to shift the rocker arms and simultaneously to cut off fuel flow to the engine. Since the plungers 12 of the fuel injectors are operated mechanically independently of the flow of fuel it is further advisable to immobilize all of the plungers 12 during braking operation of the engine to avoid scoring of the injectors in the absence of lubrication by the fuel. Within the scope of the invention any suitable control arrangement may be provided for this purpose.

In the control system shown in FIG. 1 the various rocker arms 22 for opening the exhaust valves 18 are journalled on eccentric portions 46 of a control shaft 48, the control shaft being operable by a radial arm 52. It is apparent that rotation of the shaft 48 by the arm 52 from the position shown in FIG. 1 to the position shown in FIG. 3 shifts the axis of rotation of the rocker arm to take up the lost motion between the cam and the exhaust valve. The eccentricity of the eccentric portion 46 of the control shaft on which the rocker arm 22 is mounted is relatively small because a given shift in the axis of rotation of the rocker arm results in twice as much shift on the part of the follower 36 and therefore takes up twice as much lost motion. For example, the lost motion may be on the order of .050 inch so that the shift of the axis of the rocker arm may be on the order of .025 inch. Both the outer rise 42 and the inner rise 45 of the cam are gradual for gradual acceleration of the rocker arm.

The particular control system shown in FIG. 1 includes hydraulic means, generally designated 55, for operating the radial arm 52, hydraulic means, generally designated 56 for each fuel injector 10 to immobilize the plunger 12 of the fuel injector and a master valve or rotary control valve, generally designated 58, which is operated by a suitable control handle 60 in the cab of the truck. The control handle 60 is connected to the control valve 58 by suitable means indicated by a dotted line 62, for example by a flexible shaft.

The left half of the control valve 58 controls the flow of fuel from the fuel pump 16 to the various fuel injectors 10. For this purpose a passage 64 leads from the fuel pump to the control valve; a passage 65 extends from the control valve to the various fuel injectors 10; and a third passage 66 is a return line to the fuel tank. To control these three passages, a rotary valve member 68 of the control valve 58 has a peripheral cavity 70 which at the position shown in FIG. 1 interconnects the two passages 64 and 65 and at the position shown in FIG. 3 interconnects the two passages 64 and 66.

The right half of the control valve 58 controls the single hydraulic means 55 and the plurality of hydraulic means 56. As shown in the drawing, a passage 72 connects the discharge side of the fuel pump 26 to the control valve; a passage 74 is a return line from the control valve to the crankcase 28; a passage 75 extends from the control valve to the hydraulic means 55; and a passage 76 extends from the control valve to the various hydraulic means 56, the two passages 75 and 76 being interconnected by a passage 77 equipped with a check valve 78.

The first hydraulic means 55 may be in the form of a hydraulic cylinder wherein a piston 80 biased by a spring 82 is connected by a piston rod 84 to the radial arm 52 of the shaft 48. The hydraulic means 56 for each fuel injector 10 may be a power cylinder wherein a hydraulically actuated plunger 85 is normally retracted by a spring 86. When the plunger 85 is advanced by hydraulic pressure it encounters the rocker arm 90 and acting on the rocker arm bottoms the plunger 12 of the corresponding fuel injector 10.

The rotary valve member 68 of the control valve 58 has a peripheral cavity 88 which is of sufficient extent circumferentially of the valve member to interconnect three of the four passages 72, 74, 75 and 76. In the position of the rotary valve member 68 shown in FIG. 1, a peripheral cavity 88 of the valve member 68 interconnects the three passages 74, 75 and 76.

The manner in which the first embodiment of the invention functions for its purpose may be readily understood from the foregoing description. Normally, with the engine operating to deliver power, the various parts are in the positions shown in FIG. 1. The fuel pump 16 is in communication with all of the fuel injectors 10 through the control valve 58 with the plungers 12 of the injectors reciprocated by the corresponding rocker arms 14, the plungers 85 of the corresponding hydraulic means 56 being retracted. The various rocker arms 22 for opening the exhaust valves 18 operate with their axes of oscillation slightly elevated to provide the normal lost motion between the cams 24 and the exhaust valves to make the exhaust valves nonresponsive to the inner cam rises 45, only the lobes 40 of the cams being effective for opening the exhaust valves.

Figure 2:
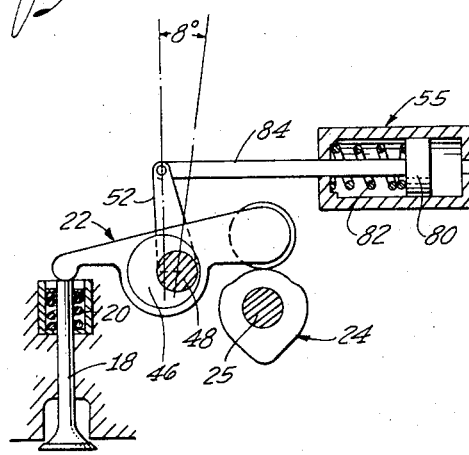
FIG. 2 is a fragment of FIG. 1 showing how the common axis of the rocker arms for the exhaust valves is shifted to carry out the braking operation of the engine.
Figure 3:
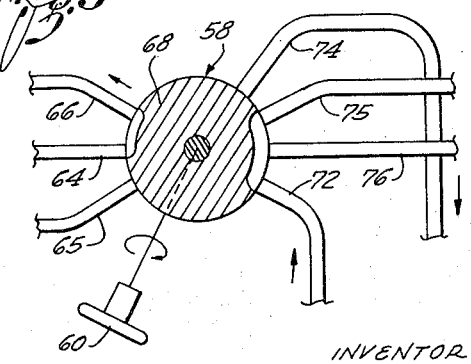
FIG. 3 is a fragment of FIG. 1 showing the control valve adjusted for the braking operation.

When the truck operates the handle 60 to turn the valve member 58 to the position shown in FIG. 3, the pressure passage 64 from the fuel line 16 is cut off from the injectors 10 and the fuel is delivered to the fuel return line 66 through the peripheral cavity 70 of the valve member. At the same time the pressurized lubricant passage 72 is placed in communication with the passages 75 and 76 that lead to the hydraulic means 55 and 56 respectively. The pressurized lubricant admitted to the hydraulic means 55 advances the piston 80 against the spring 82 to swing the rocker arm 52 to the position shown in FIG. 2. The consequent slight shift of the axis of oscillation of the various rocker arms 22 eliminates the usual lost motion between the cams 24 and the exhaust valves to cause the exhaust valves to respond to the inner rises 45 of the cams to advance the opening of the exhaust valves as required for the braking operation. At the same time the pressurized lubricant delivered to the various hydraulic means 56 extends the corresponding plungers 85 to bottom and immobilize the corresponding injector plungers 12.

When the control valve 58 is returned to its normal position to terminate a braking operation, the fuel pump 16 is again placed in communication with various fuel injectors 10 and the two passages 75 and 76 are both placed in communication with the lubricant return line 35 to permit the piston 80 and the plungers 85 to retract to their normal positions.

The second embodiment of the invention shown in FIGS. 4–7 is largely similar to the first embodiment but provides a different arrangement for temporarily eliminating the normal lost motion between the cams and the exhaust valves. Broadly described, the second embodiment of the invention interposes hydraulic means between the cams 24 and the exhaust valves 18 for temporary elimination of the normal lost motion by remote control. FIG. 7 shows how such a hydraulic means may be incorporated in the construction of a rocker arm.

The rocker arm 90 in FIG. 6 for operating an associated exhaust valve 18 is journalled for rotation on a hollow shaft 92 with the heel of the rocker arm overhanging a previously described cam 24 in the usual manner. The outer end of the rocker arm 90 forms a cylinder 94 in which a plunger 95 is slidingly mounted in abutment with the stem of the exhaust valve 18. In the construction shown, a fixed retainer pin 98 extends through a diametric bore 100 of the plunger 95, the bore being sufficiently oversized to permit a desired range of lost motion by the plunger. A suitable spring 102 acting under compression between a circumferential shoulder 104 of the plunger and the inner end of the cylinder 94 urges extension of the plunger and thereby biases the rocker arm counterclockwise to hold the follower 105 in continuous contact with the cam 24.

During normal power operation of the engine, the rise 45 in the inner zone of the cam lifts the follower 105 but does not operate the relief valve because the lifting of the follower merely takes up the lost motion to cause the plunger 95 to bottom in the cylinder 94 in opposition to the spring 102. When the outer rise 42 of the cam reaches the follower 105, however, the rocker arm is effective to open the relief valve because the plunger 95 is bottomed. Thus the hydraulic means on the rocker arm, in effect, normally permits lost motion between the cam 24 and the exhaust valve to make only the outer radial zone of the cam effective during normal operation of the engine. When the hydraulic means on the rocker arm is pressurized, however, the plunger 95 is hydraulically locked against retraction to eliminate the lost motion and thus make the inner radial zone of the cam effective for the braking operation.

A feature of this embodiment of the invention is the manner in which the hydraulic fluid is transmitted to the cylinder 94 of a rocker arm 90 without the use of any dynamic seal whatsoever. This feature will not be explained.

The hydraulic fluid, i.e. the pressurized lubricant from the lubricant pump 26, is supplied to the various rocker arms 90 in pairs, each pair of rocker arms being supplied with hydraulic fluid by the structure shown in FIGS. 7 and 8. The shaft 92 on which the two rocker arms 90 are rotatably mounted is of tubular configuration for use in the hydraulic system. The hydraulic fluid for the pair of rocker arms 90 is provided by a fixed nipple 106 that is mounted on fixed structure 108 and is connected to the hydraulic control system. The nipple 106 is threaded into a fixed collar 110 that embraces the tubular shaft 92 and the nipple extends through a radial bore 112 of the tubular shaft with the inner end of the nipple extending into a fixed sleeve 114 inside the shaft. A thin walled tube 115 of relatively small diameter is fixedly mounted at one of its ends in the sleeve 114 and is fixedly mounted at its other end in a sleeve 116 that is floatingly mounted inside the tubular shaft 92 in the region of one of the two rocker arms 90. In like manner a second thin walled tubular sleeve 115 extends from the fixed sleeve 114 to a second floating sleeve 116 associated with the other rocker arm.

Each of the two rocker arms 90 is connected to the corresponding floating sleeve 116 by a drilled plug 118 that is threaded into the rocker arm, the drilled plug extending through a slot 120 in the tubular shaft into the floating sleeve 116. The slot 120 is of sufficient circumferential extent to permit the drilled plug 118 to oscillate with the rocker arm relative to the fixed tubular shaft 92. The two tubes 115 are made of resilient material to permit them to serve as torque tubes, each tube being twisted or stressed in torque to permit the corresponding floating sleeve 116 to oscillate relative to the central fixed sleeve 114. The drilled plug 118 in each rocker arm 90 is formed with an axial bore (not shown) for communication with the interior of the corresponding floating sleeve 116 and is further formed with a radial bore (not shown) that places the axial bore in communication with a bore 125 in the rocker arm that leads to the corresponding cylinder 94. It is apparent that this arrangement characterized by the use of torque tubes places the fixed nipple 106 in communication with the oscillating nipples 116 without employment of a dynamic seal in which a sealing element is associated with two relatively movable surfaces and is in sliding contact with at least one of the two surfaces.

Figure 4:
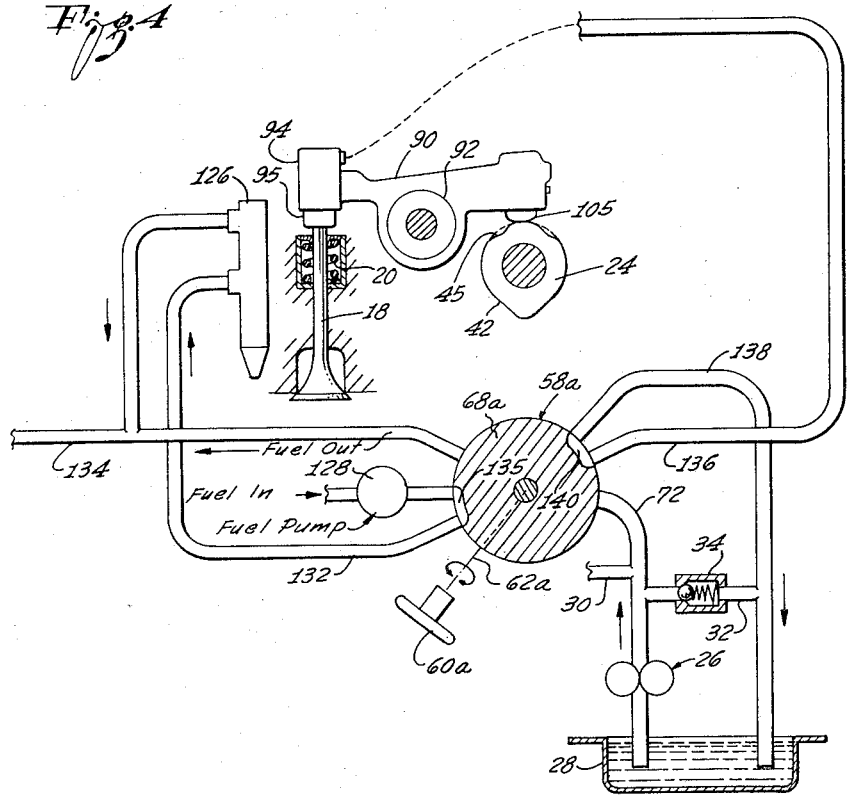
FIG. 4 is a diagrammatic representation of a second embodiment of the invention with the parts positioned for normal power operation of the engine.
Figure 5:
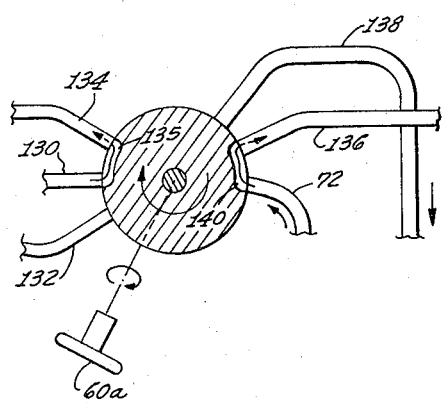
FIG. 5 is a fragment of FIG. 4 showing the control valve adjusted for the braking operation of the engine.

In the overall arrangement of the second embodiment of the invention shown diagrammatically in FIG. 4, fuel injectors 126 are employed of the hydraulic type that are operated by pressure pulses created by a fuel pump means 128. Since the plungers (not shown) of the hydraulic fuel injectors 126 serve merely as check valves and are actuated by hydraulic pressure pulses instead of being actuated by cams, it is not necessary to provide special means to immobilize the injector plungers when the fuel is cut off.

In the control system shown in FIG. 2, a rotary control valve 58a has a rotary valve member 68a which is connected to a handle 60a by suitable means 62a. The left side of the control valve 58a is connected to the following passages: a passage 130 from the fuel pump means 128; a passage 132 leading to the fuel injector 126; and a fuel return passage 134. When the valve member 68 is in the normal rotary position shown in FIG. 4, a peripheral cavity 135 of the valve member places passage 130 in communication with passage 132 to supply fuel to the various fuel injectors 126 for normal power operation of the engine. When the valve member 68a is in the alternate position shown in FIG. 6, the peripheral cavity 135 places the passage 130 in communication with the return passage 134 to cut off the fuel injectors and to bypass the fuel to the return passage.

The right half of the valve 58a is connected to the following passages: a previously mentioned passage 72 on the output side of the lubricant pump 26; a passage 136 for supplying pressurized fluid to the various rocker arms 90; and a passage 138 which is a return line back to the crankcase 128.

When the valve member 68a is in the normal position shown in FIG. 4 for normal power operation of the engine, a peripheral cavity 140 of the valve member places the passage 136 in communication with the return passage 138 and cuts off the pressurized passage 72. When the valve member 68a is at its alternate position shown in FIG. 6 for braking operation of the motor, the peripheral cavity 140 places the pressurized passage 72 in communication with the passage 136 for delivering pressurized fluid to the cylinders 94 of the various rocker arms 90. As heretofore described, supplying the lubricant under pressure to the cylinders 94 of the rocker arms causes the exhaust valves to be operated by the inner radial zones of the cams 24 instead of the outer radial zones.

The invention has been described with the valve-actuating rocker arms in direct contact with the actuating cams, such an arrangement being found, for example in an overhead cam shaft engine. It is apparent that the invention may be applied equally well to arrangements in which the valve-actuating rocker arms are spaced from the actuating cams by tappets and push rods, for example in V–8 engines.

My description in specific detail of the selected embodiments of the invention will suggest various changes, substitutions and other departures from my disclosure within the spirit and scope of the appended claims. For example, in the normal power operation of the engine, the exhaust valves may be responsive to the inner radial zones of the cams instead of the outer radial zones. In other words, lost motion between the cams and the exhaust valves may be temporarily introduced for braking operation instead of temporarily removed.

I claim:

1. In an internal combustion engine wherein means including a rotary cam and a follower cooperative therewith opens an exhaust valve, the improvement for normal power operation and braking operation of the engine selectively, comprising:

said cam being shaped with an outer radial zone having a first rise and an inner radial zone having a second rise spaced circumferentially from the first rise; and means to shift the responsiveness of the exhaust valve between the two radial zones for actuation of the follower by the two rises selectively.

2. An improvement as set forth in claim 1 in which the exhaust valve is operated by the first outer rise of the cam with lost motion between the cam and the exhaust valve to make the exhaust valve nonresponsive to the second inner rise of the cam; and which includes control means to reduce the lost motion to make the exhaust valves responsive to the second inner rise of the cam.

3. An improvement as set forth in claim 2 in which the follower is on a rocker arm that opens the exhaust valve; and in which the means that reduces the lost motion is operable to shift the axis of rotation of the rocker arm relative to the cam.

4. An improvement as set forth in claim 3 in which includes a control member journalled for rotation on a given axis, said control member having a portion positioned eccentrically of the given axis;

in which said rocker arm is journalled on said eccentric portion; and in which means is provided to rotate the control member about the given axis by remote control to swing said eccentric portion of the control member in an arc to shift the axis of oscillation of the rocker arm relative to the cam.

5. An improvement as set forth in claim 2 in which:

hydraulic means to eliminate the lost motion is mounted on a rocker arm that carries the followers;

in which hydraulic fluid is transmitted to the rocker arm; and which includes means placing the rocker arm in communication with a source of pressurized fluid, said communicating means including a torque tube on the axis of oscillation of the rocker arm with one end of the torque tube fixedly anchored and with the other end fixedly connected to the rocker arm to avoid the use of a dynamic seal, the torque tube yielding in torque to accommodate oscillation of the rocker arm.

6. In an internal combustion engine which includes a lubricant oil pump and wherein a rotary cam and a follower cooperative therewith open an exhaust valve, the improvement for normal operation and braking operation selectively of the exhaust valve, comprising:

said cam being shaped with an outer radial zone having a second shoulder spaced circumferentially from the first shoulder; and remotely controlled hydraulic means operated by said pump to reduce lost motion between the cam and the exhaust valve to shift the responsiveness of the exhaust valve from the first outer rise to the second inner rise.

7. An improvement as set forth in claim 6 in which said engine is a diesel engine equipped with fuel injection means; and which includes remotely controlled hydraulic means to immobilize the fuel injection means when the first mentioned hydraulic means is actuated.

8. In an internal combustion engine, the combination of:

fuel injection means;

first pump means to supply fuel to the fuel injection means;

lubrication means including a second pump means for lubricant;

exhaust valves;

mechanism to operate the exhaust valves for normal power operation of the engine;

hydraulic means operatively connected to said mechanism to advance the opening of the exhaust valves for braking operation of the engine;

a control movable between a first normal position for normal operation of the engine and a second position for braking operation of the engine; and means responsive to the control to place the first pump means in communication with the fuel injection means and to cut off the second pump means from the hydraulic means at the first position of the control and to cut off the first pump means from the fuel injection means and to place the second pump means in communication with the hydraulic means at the second position of the control.

9. A combination as set forth in claim 8 in which includes means to immobilize the fuel injection means in response to movement of the control to its second position.

10. A combination as set forth in claim 8 in which said mechanism to operate the exhaust valves includes rotary cams corresponding to the exhaust valves and correponding followers cooperative with the cams;

in which each of said cams is shaped with an outer radial zone having a first rise and an inner radial zone having a second rise spaced circumferentially from the first rise; and in which said hydraulic means shifts the responsiveness of the exhaust valves from one of said radial zones to the other radial zone.

References Cited

UNITED STATES PATENTS

| | | | |
|---|---|---|---|
| 1,637,117 | 7/1927 | Kirchensteiner | 123—97 |
| 2,197,282 | 4/1940 | Walker | 123—97 |

RALPH D. BLAKESLEE, *Primary Examiner.*